United States Patent Office  3,269,878
Patented August 30, 1966

3,269,878
METHOD OF PRODUCING III-V SEMICONDUCTOR COMPOUNDS IN CRYSTALLINE FORM
Federico Edwardo Wenzel, Hamburg-Bergedorf, and Hans Merkel, Erlangen, Germany, assignors to Siemens-Schuckertwerke Aktiengesellschaft, Berlin-Siemensstadt, Germany, a corporation of Germany
Filed Dec. 5, 1963, Ser. No. 334,961
Claims priority, application Germany, Mar. 29, 1962, S 78,719; Dec. 12, 1962, S 82,828
21 Claims. (Cl. 148—175)

Our invention relates to the production of $A^{III}B^V$ compounds and is disclosed herein as a continuation-in-part of our copending application Serial No. 266,736, filed March 20, 1963.

More particularly, the invention relates to the production of the phosphides, arsenides and antimonides of boron, aluminum, gallium and indium, in crystalline form and the extreme degree of purity required for electronic semiconductor and related purposes.

It is an object of the invention to provide a reliably reproducible method of preparing such semiconductor crystals without the coaction of constituents other than those of the compound to be formed and hence to thereby obtain products of higher purity than those resulting from heretofore available production methods.

Another object is to increase the yield of monocrystals directly resulting from the compound manufacturing process.

According to the invention, we place the starting material, in the form of the III-V compound or the corresponding element from the Third Group, into contact with a vapor current of the element from the Fifth Group of the Periodic System in a zone of high temperature within a reaction system not containing any foreign elemental substance that can participate in the reaction, and we thereafter pass the gas into a zone of lower temperature where the compound precipitates from the gas in crystalline form, namely in polycrystalline as well as in monocrystalline constitution.

The term "zone of high temperature" is understood herein to mean the temperature at which the starting material is converted to the vaporous phase and an appreciable, i.e. technically applicable, vapor pressure is produced.

The monocrystals obtained by the method of the invention are of well-defined shape and have a cubic crystal structure. They are considerably purer than the starting material employed.

A particular advantage of the method according to the invention and its purifying effect is the fact that the amorphous or crystalline III-V compound or its individual elemental constituents used as starting material may have any desired purity degree.

Another advantage of the invention is based upon the fact that the physical-chemical phenomena upon which the method is predicated, do not involve the participation of any elements other than those from which the III-V compound is formed. For that reason, contamination by other elements is prevented to a great extent.

The method according to the invention can be performed in an open or in closed (sealed) reaction system. When an open system is employed, the vapor atmosphere of the element from the Fifth Group can be moved by means of an inert carrier gas, for example helium or argon, to flow over the III-V compound or the element of the Third Group serving as starting material. The flowing speed of the vapor atmosphere of the element from the Fifth Group is not critical. It may be kept between 0.1 to 1000 m./hour.

According to a modification of the method, a system closed at one side is employed. The vapor produced from the element of the Fifth Group is discharged through the open end of the system, for example by using a pumping device for exhausting the vapor. A continuous vapor current of the element from the Fifth Group can also be maintained by condensing this vapor in a cooling device at the outlet end of the reaction system.

Compiled in the following Table 1 are the necessary temperature differences between the zone of high temperature and the zone of low temperature.

TABLE 1

Temperature difference between the zones of high and low temperature

BP—at least 30° C., preferably 100 to 600° C.
AlP—at least 30° C., preferably 100 to 900° C.
GaP—at least 15° C., preferably 100 to 900° C.
InP—at least 15° C., preferably 80 to 500° C.
BAs—at least 30° C., preferably 200 to 850° C.
AlAs—at least 20° C., preferably 150 to 800° C.
GaAs—at least 15° C., preferably 150 to 700° C.
InAs—at least 10° C., preferably 100 to 500° C.
AlSb—at least 15° C., preferably 100 to 700° C.
GaSb—at least 10° C., preferably 50 to 500° C.
InSb—at least 10° C., preferably 50 to 700° C.

The following Table 2 indicates the temperature ranges for the zone of high temperature, as well as for the zone of low temperature, and the vapor pressure of the element from the Fifth Group, required for the method of the invention in the production of the various III-V semiconductor compounds.

TABLE 2

| | Zone high temperature | | Zone low temperature (Preferred range) ° C. | Vapor pressure of the Fifth Group element | |
|---|---|---|---|---|---|
| | Minimum, ° C. | Preferred range, ° C. | | Minimum, atm. | Preferred range, atm. |
| BP | 530 | 1,000–1,600 | 800–1,500 | 0.01 | 0.5–10 |
| AlP | 500 | 900–1,800 | 500–1,400 | 0.01 | 0.5–10 |
| GaP | 400 | 900–1,600 | 300–1,000 | 0.01 | 0.5–10 |
| InP | 250 | 500–1,000 | 200–800 | 0.01 | 0.5–10 |
| BAs | 450 | 1,000–1,800 | 400–1,600 | 0.001 | 0.5–10 |
| AlAs | 400 | 900–1,800 | 350–1,500 | 0.001 | 0.5–10 |
| GaAs | 400 | 900–1,600 | 300–1,200 | 0.001 | 0.5–10 |
| InAs | 150 | 500–1,000 | 250–930 | 0.001 | 0.5–10 |
| AlSb | 250 | 700–1,700 | 300–1,050 | *10⁻⁴ | *10⁻³–50 |
| GaSb | 200 | 600–1,600 | 250–690 | *10⁻⁴ | *10⁻³–10⁻¹ |
| InSb | 150 | 500–1,600 | 200–510 | *10⁻⁴ | *10⁻³–10⁻² |

*=Torr.

The invention will be further explained with reference to the drawing and with reference to processing examples.

Figure 1:
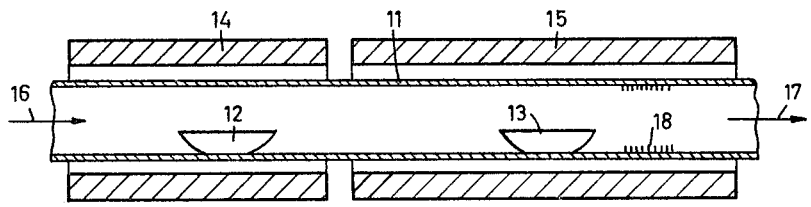
FIG. 1 shows in section a device for performing the method according to the invention with the aid of an open reaction system.

Referring to FIG. 1, the reaction system denoted by 11 consists of a tube open at both ends. Located in the tube are two boat-shaped containers 12 and 13. Container 12 serves for receiving the element from the Fifth Group, and container 13 for receiving the starting material in the form of a III-V compound or the corresponding element from the Third Group. The reaction tube 11 is located in the interior of two tubular furnaces 14 and 15. The inert carrier gas is introduced into the reaction system at 16 and leaves the system at 17. Schematically shown at 18 is the resulting III-V compound which precipitates in polycrystalline as well as in monocrystalline constitution.

The tubular reaction system 11 may consist of aluminum oxide ($A_2O_3$, sintered alumina) and is heated by the two furnaces 14 and 15 so that three different temperature zones are formed along the reaction system. The first temperature zone serves for producing the vapor atmosphere of the element from the Fifth Group located in container 12. In the second temperature zone (zone of high temperature), the supply of starting material in container 13 is converted to the vaporous phase. The third temperature zone is that in which the purified crystalline III-V compound precipitates at 18. The precipitation zone can be designed as a removable portion of the device, for example in form of inserted shells forming a longitudinally subdivided tube or insert which is placed into the reaction tube 11 and can be withdrawn therefrom.

Figure 2:
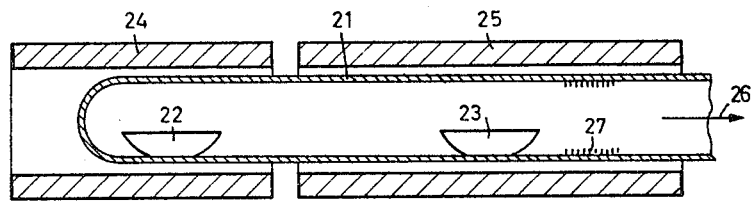
FIG. 2 shows in section another device for practicing the invention with a unilaterally closed reaction system.

According to FIG. 2, the reaction system 21 consists of a tube closed at one end. Located in the interior of the tube are two boat-shaped containers 22 and 23. Container 22 receives the element from the Fifth Group. Container 23 receives the starting material.

The reaction tube 21 is located coaxially within two aligned tubular furnaces 24 and 25. The open end of the tube at 26 is connected to a pump device or cooler (both not illustrated) for maintaining a continuous current of vapor from the Third Group element vaporizing in container 22. Schematically shown at 27 is the crystalline III-V compound which precipitates in polycrystalline and monocrystalline constitution.

Figure 3:
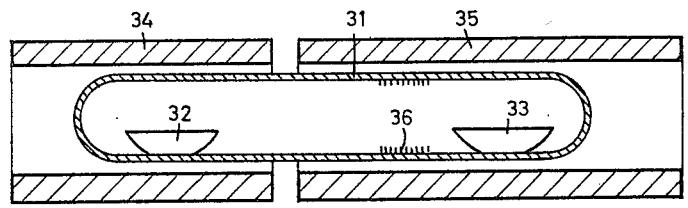
FIG. 3 shows a device for performing the method of the invention with a fully closed reaction system.

According to FIG. 3, the reaction system consists of a tube 31 closed at both ends. Located at 32 in the interior of the tube is the element from the Fifth Group, and at 33 an amount of the element from the Third Group or the corresponding starting material. The closed reaction system is located within two tubular furnaces 34 and 35. Schematically shown at 36 is the resulting III-V compound which precipitates in the form of monocrystals as well as in polycrystalline form.

By inserting baffle walls or partitions into the precipitation zone, the yield of monocrystals can be increased.

If desired, a supporting structure for a substrate or a similar device may be inserted into the tubular reaction system to afford epitaxial precipitation of the III-V compound upon another material of the same or similar crystalline lattice structure. In this manner, the resulting III-V semiconductor substance can be precipitated upon pre-inserted bodies of the same semiconductor material, for example.

The apparatus may be arranged horizontally, vertically, or in any other direction. The carrier gas, as well as the atmosphere of the element from the Fifth Group employed can be recirculated for re-use in the process. The apparatus may also be so designed that it first produces the phosphide, arsenide, or antimonide of the element from the Third Group in known manner, for example from the elemental constitutents, and that during this process or after termination thereof, the crystal-producing process according to the invention proper is performed. In this case, the freshly formed phosphide, arsenide, or antimonide is converted to the vaporous phase with the aid of the phosphorus, arsenic, or antimony vapor atmosphere previously employed for the production thereof, and the vapor is then caused to precipitate in the proper, cooler zone of the apparatus to form crystals in accordance with the invention and as described above.

The method of the invention permits admixing doping substances, for example zinc or cadmium as acceptors and selenium or tellurium as donors, to the vapor of the element from the Fifth Group or the starting material for the purpose of producing polycrystalline or monocrystalline III-V compounds of a predetermined conductance (specific resistances) or type of conductance. By repetition of the method, therefore, III-V monocrystals having a layer sequence of respectively different conductance type can be produced, for example in n-p-n or p-n-p junction sequences. This is done by admixing different doping substances to the vapor of the element from the Fifth Group or the starting material being used.

The method of the invention will now be described more in detail with reference to the production of boron phosphide, this being a III-V semiconductor material that in the past has posed extremely great production difficulties in cases where monocrystals of extremely high purity are required.

In principle, there are two ways of forming boron phosphide:

(1) Production from the component elements,
(2) Formation by conversion of boron and phosphorus compounds.

Based upon the first-mentioned principle is a method known from U.S. Patent 3,021,196, according to which elemental, amorphous boron is reacted with gaseous phosphorus at a temperature of 1000° C., using $CoP_3$ as the source of phosphorus.

Another method for producing boron phosphides is performed at temperatures of about 1000° C. and employs elemental amorphous boron together with gaseous phosphorus directly produced from elemental phosphorus (Popper, P., Ingles, T. A., 1957, Boronphosphide, a III-V-Compound of Zinc/Blende Structure, Nature 179, 1075). Both methods furnish microcrystalline up to fine-crystalline boron phosphide.

A method, based upon the second principle of converting boron compounds and phosphorus compounds, is described, for example, in French Patent No. 1,260,476:

$$B\text{-metal alloy} + P\text{-metal alloy} \quad BP$$

A material to be employed for semiconductor purposes is desired to fundamentally meet the following requirements:

(1) The material should preferably be available in form of monocrystals;
(2) The monocrystals should be of sufficiently large size;
(3) The monocrystals should have a sufficiently high degree of purity.

A major difficulty, in attempts to produce boron phosphide in sufficiently large monocrystals, is due to the extremely high melting point of boron phosphide, which melting point is expected to be above 3000° C. Therefore, the method of producing monocrystals from the melt, otherwise employed for $A^{III}B^V$ compounds, is not applicable for boron phosphide. It is therefore necessary to seek methods that afford growing boron phosphide monocrystals out of the vaporous phase.

It is therefore a more specific object of our invention to provide such a method of growing boron phosphide monocrystals by economically applicable means whereby larger monocrystals are obtained than heretofore. Another object of the invention is to produce boron phosphide crystals in a degree of purity considerably higher than that heretofore attained.

According to our invention, we place the boron-phosphide starting material without extraneous elemental substances, within a high-temperature zone maintained at at least 530° C. of a reaction system, in contact with a phosphorous-vapor current. We then pass the gas into a zone of lower temperature and effect, in the latter zone, the precipitation of crystalline boron phosphide from the gas. Boron phosphide thus precipitates in polycrystalline and monocrystalline form.

The monocrystals, resulting from the method of the invention, are of a well-defined elongated shape and of cubic crystalline structure. Their size exceeds the dimensions of the boron phosphide monocrystals produced in accordance with other, known methods. The purity of the polycrystalline, as well as of the monocrystalline boron phosphide is very much greater than the purity of boron phosphide crystals heretofore producible by known methods. Another advantage of the invention is that amorphous or crystalline boron phosphide of any available degree of purity can be employed as starting material.

The phosphorus used for the purpose of the invention is preferably of the highest available purity (99,999 or higher), if extremely pure boron phosphide is to be obtained. In conjunction therewith, an essential requirement is the employment of a phosphorus-vapor atmosphere for obtaining the conversion of the boron phosphide or its components into the gaseous phase and its subsequent reprecipitation in purified crystalline (mono- or polycrystalline) form. This method differs from an ordinary distillation or sublimation in that the conversion of the boron phosphide or its components into the gaseous phase is effected by a physical-chemical reaction between the boron phosphide used as starting material and the elemental phosphorus.

As is apparent from Tables 1 and 2, the high-temperature zone of the reaction system is preferably kept at a temperature between 1000° C. and 1600° C., and the low-temperature zone, in which the precipitation of the pure crystals takes place, is preferably kept at a temperature between 800 and 1500° C., the temperature difference between the two zones being at least 30° C., but preferably 100 to 600° C. The flow velocity of the phosphorus-vapor atmosphere is preferably maintained from 0.5 to 1500 cc./min. When operating with a unilaterally closed reaction system and withdrawing the phosphorus vapor at the open end of the system, a pumping device for exhausting the phosphorus vapor can be used, or a continuous current of phosphorus vapor can be maintained by condensing the phosphorus vapor in a cooling device at the outlet end of the reaction system. The phosphorus-vapor atmosphere is produced, for example by heating of elemental red or yellow phosphorus. The phosphorus-vapor pressure is kept at least at 0.01 atmosphere, but is preferably within the range of 0.5 to 10 atmospheres. The duration of the reaction is not critical; it may vary between one minute and several months.

In order to improve the purifying effect of the method, it can be performed repeatedly. That is, the purified BP crystals obtained by the method can again be used as starting material in the same manner as described above in order to yield a second generation of crystals exhibiting increased purity.

The crystalline boron phosphide obtained in accordance with the invention is monocrystalline to a large extent, the monocrystals having a longitudinal dimension up to some millimeters.

Example 1

A boat of aluminum oxide is filled with a specimen of polycarystalline boron phosphide and placed into an aluminum oxide tube open at both ends according to FIG. 1. Another boat of aluminum oxide is supplied with red phosphorus and disposed at the entrance of the tube (boat 12 in FIG. 1). The phosphorus is heated to 400° C. and the boron phosphide to 1500° C. A current of helium is supplied into the tube through its entrance (16 in FIG. 1) at a rate of 2.5 liters per hour. The helium passes first along the heated phosphorus and subsequently along the boron phosphide. The temperature at the zone following the boron phosphide is heated to 1265° C. Under the operating conditions mentioned, purified boron phosphide precipitates from the phosphorus-vapor atmosphere in monocrystalline form. The crystals are removed.

Example 2

A unilaterally closed quartz tube (21 in FIG. 2) is supplied at the closed end with 20 g. of red phosphorus. Disposed in an aluminum oxide boat are 4 g. of amorphous boron, this boat being placed into the middle portion of the tube. The air contained in the tube is displaced by means of argon. The tube is placed into two horizontally aligned furnaces so that the phosphorus is located in one furnace and the boron in the other furnace (substantially as exemplified by FIG. 2). The phosphorus is heated to 400° C., the boron to 1100° C., and the BP-separation zone to 910–980° C. The gaseous phosphorus is condensed in a cooling device at the outlet of the tube as a continuous phosphorus-vapor current passes through the tube. After proceeding in this manner for 300 hours the tube is permitted to cool. The boron has been found to be converted together with the gaseous phosphorus into micro-crystalline and fine-crystalline BP. In the BP-precipitation zone, spaced a few centimeters from the freshly formed fine-crystalline BP, monocrystals of BP are found to have grown from the gaseous phase on the tube wall.

Example 3

A unilaterally closed tube of aluminum oxide is used. 4 g. of amorphous boron is deposited in the vicinity of the closed end. Placed into the tube at the other end are 13 g. red phosphorus. Thereafter the tube is evacuated and sealed before being placed into two horizontally aligned electric resistance furnaces so that the boron is located in one furnace and the phosphorus in the other. The boron is heated to 1100° C., the phosphorus to 400° C., and the BP-precipitation zone to about 910–980° C. After 325 hours the tube is cooled and opened. The boron has reacted with the gaseous phosphorus and has formed micro-crystalline and fine-crystalline boron phosphide. A few centimeters away from this freshly formed boron phosphide, namely in the BP-precipitation zone, a growth of boron phosphide monocrystals on the tube wall is found.

The method according to the invention is analogously applicable to the other III-V compounds mentioned above. This is exemplified by the following examples.

Example 4

A boat of aluminum oxide (sintered alumina) is filled with 3 g. granulated aluminum and is placed into an aluminum oxide tube open at both ends according to FIG. 1. Another boat of aluminum oxide is filled with 27 g. red phosphorus and placed into the entrance end of the tube (boat 12 in FIG. 1). The phosphorus is heated to 400° C. and the aluminum to 1250° C. with the aid of electric resistance furnaces such as those of the tubular shape shown in FIG. 1. A current of argon is passed through the tube from the side (16) of the phosphorus-containing boat at a rate of 2 liters per hour. The argon passes first along the heated phosphorus and subsequently along the aluminum. The aluminum reacts with the gaseous phosphorus and forms AlP. The AlP thus produced constitutes the starting material for the method of the invention proper. While the phosphorus temperature of 400° C. and the AlP temperature of 1250° C. are being maintained, crystalline AlP precipitates from the phosphorus vapor atmosphere in the zone following the AlP-formation region, this precipitation zone being heated to 825 to 1020° C.

Example 5

A tube of sintered alumina closed at one end is supplied with 40 g. red phosphorus located in an alumina boat and placed near the closed end. A second alumina boat is provided with 3 g. granular metallic aluminum and placed into the middle portion of the tube. The air contained in the tube is rinsed out with argon. The tube is placed into two horizontally aligned furnace so that the phosphorus is located in one furnace and the aluminum in the other furnace (FIG. 2). The phosphorus is then heated to 410° C., and the aluminum to 1280° C. The gaseous phosphorus is condensed in a cooling device at the outlet of the tube so that a continuous phosphorus-vapor current passes through the tube. The aluminum reacts first with the gaseous phosphorus so that AlP is formed. This aluminum phosphide is employed, without interrupting the process, for performing the method of the invention during which the phosphorus temperature of 410° C. and the AlP temperature of 1280° C. are maintained. In the latter process, the precipitation zone following the aluminum-containing boat in the flow direction of the vapor is kept at a temperature of 795 to 1050° C. The processing is continued for a total period of 70 hours, whereafter the tube is permitted to cool to room temperature. Crystalline AlP is now found precipitated in the precipitation zone.

*Example 6*

Placed into a unilaterally closed tube of alumina, in the vicinity of the closed end, is an alumina boat containing 1.7 g. granular metallic aluminum. Another alumina boat with 3 g. red phosphorus is placed into the tube near the open end. The tube is thereafter evacuated, sealed, and placed into two horizontally aligned furnaces so that the aluminum is located in one furnace and the phosphorus in the other furnace (FIG. 3). The aluminum is heated for 24 hours to 700° C., and the phosphorus heated simultaneously to 360° C. Aluminum is thus converted to AlP. Thereafter, the temperature of the AlP is set to 1250° C. and the temperature of the phosphorus to 400° C. After a total heating period of 168 hours, the tube is permitted to cool down to room temperature. The aluminum has reacted with the gaseous phosphorus, and monocrystalline AlP needles of up to 20 mm. length have precipitated in the temperature zone between 650 to 775° C. (FIG. 3).

*Example 7*

An alumina boat is filled with 3 g. GaP and placed into an alumina tube open at both ends. A second alumina boat is provided with 25 g. red phosphorus and placed into the tube at the gas inlet end thereof. The tube is placed into two horizontally aligned tubular furnaces with whose aid the phosphorus is heated to 400° C. and the GaP to 1500° C. A current of argon is supplied to the inlet end of the tube at a rate of 2 liters per hour, passing first over the heated phosphorus and thence over the heated GaP. The temperature zone behind the GaP is heated to 750 to 1080° C. GaP in form of monocrystals of up to 17 mm. length precipitates in the latter zone.

*Example 8*

Used is a unilaterally closed tube of alumina. Placed near the closed end is an alumina boat with 35 g. red phosphorus. Another alumina boat containing 3 g. GaP is placed into the middle portion of the tube. The tube is rinsed with argon to remove the air and is then inserted into two horizontally aligned furnaces so that the phosphorus is located in one furnace and the GaP in the other. The phosphorus is heated to 410° C., the GaP to 1480° C. The gaseous phosphorus is condensed at the outlet of the tube in a cooler so that a continuous current of phosphorus vapor passes through the tube. After 75 hours the tube is cooled. The temperature zone following the gallium phosphide starting substance and exhibiting a temperature of 805 to 1110° C. now contains a precipitation of monocrystalline GaP.

*Example 9*

An alumina boat with 0.9 g. GaP is placed near the closed end of a unilaterally closed tube of alumina. Another alumina boat containing 2 g. red phosphorus is placed near the other end of the tube. Thereafter, the tube is evacuated and sealed before being placed into two horizontally aligned furnaces so that the GaP supply is located in one furnace and the phosphorus in the other. The GaP is heated to 1450° C., the phosphorus to 400° C., and the GaP precipitation zone to 580 to 800° C. After 113 hours, the tube is cooled to room temperature and opened. GaP has precipitated in the precipitation zone in form of hair-like crystals and monocrystalline needles.

*Example 10*

A quartz boat is filled with 2 g. InP and placed into a quartz tube open at both ends. Also placed into the tube is a quartz boat filled with 45 g. red phosphorus and located at the entrance end. The tube is placed into two horizontally aligned furnaces. The phosphorus is heated to 400° C., the InP to 1000° C. A current of argon is supplied at the rate of 1 liter per hour to the entrance end of the tube and passes first over the heated phosphorus and then over the InP. The temperature zone following the InP in the gas flow direction is kept at 715 to 850° C. InP precipitates in the latter zone in form of monocrystals as well as in polycrystalline constitution.

*Example 11*

Placed into a unilaterally closed quartz tube near the closed and thereof is a quartz boat with 50 g. red phosphorus. Placed into the middle portion of the tube is a quartz boat with 2 g. InP. The air is removed by means of argon. The tube is placed into two horizontally aligned furnaces so that the phosphorus is located in one furnace and the InP in the other. The phosphorus is heated to 410° C., the InP to 800° C. The temperature zone following the InP is kept at 390 to 425° C. The gaseous phosphorus is condensed at the outlet opening of the tube in a cooler so that a continuous phosphorus vapor current passes through the tube. After 44 hours the tube is permitted to cool down to room temperature. InP has precipitated in monocrystalline form.

*Example 12*

Placed near the closed end of a unilaterally closed tube of quartz is a quartz boat with 1 g. InP. Placed into the tube near the other end is a quartz boat with 1 g. red phophorus. The tube is evacuated and sealed before being placed into two horizontally aligned furnaces, so that the InP supply is located in one furnace and the phosphorus supply in the other. The InP is heated to 600° C., the phosphorus to 400° C., and the InP-precipitation zone to 360 to 400° C. InP precipitates in the latter zone in the form of monocrystalline needles.

*Example 13*

Placed into an evacuated alumina ampule near one end thereof are 2.5 g. of aluminum, and near the other end 9 g. of arsenic in respective alumina boats. The ampule is placed into two furnaces as in the preceding examples, and the Al is heated to 1500° C., the As to 610° C. After maintaining these temperatures for 190 hours, the ampule is cooled. In the intermediate zone, previously at 800 to 1020° C., AlAs has precipitated in form of crystals, predominantly monocrystals.

*Example 14*

Placed into an alumina tube open at both ends are 3 g. of AlSb near one end and 3 g. of Sb near the other end in respective boats of alumina. The tube is placed into two furnaces located beside each other as described in the preceding examples. The AlSb is heated to 1400° C., the Sb to 1000° C. A current of argon is passed through the tube at the rate of 2 liters per hour. After 38 hours the tube is cooled. In the intermediate zone, previously heated to 850 to 970° C., AlSb has precipitated in crystalline, predominantly monocrystalline form.

*Example 15*

Placed near one end of an evacuated alumina ampule are 1.5 g. GaAs and near the other end 1 g. As in respective boats of alumina. The ampule is placed into two furnaces located beside each other. The GaAs is heated to 1200° C., the As to 610° C. After 25 hours the ampule is cooled. It is found that GaAs has precipitated in crystalline, predominantly monocrystalline, form in the intermediate zone previously at 740 to 950° C.

Example 16

An alumina tube open at both ends is provided at one end with 1.5 g. GaSb and at the other end with 3.9 g. Sb in respective boats of alumina. The tube is placed into two furnaces as described in the preceding examples. The GaSb is heated to 750° C., the Sb to 620° C. A current of argon is passed through the tube at the rate of 2 liters per hour. After 89 hours the tube is permitted to cool. In the intermediate zone, previously heated to 460 to 650° C., GaSb has precipitated in crystalline, predominantly monocrystalline, form.

Example 17

An evacuated ampule of alumina is provided near one end with 1.5 g. InAs and near the other end with 1 g. As in respective boats of alumina. The ampule is placed into two furnaces located beside each other as described, and the InAs is heated to 800° C., the As to 610° C. After 106 hours the ampule is cooled. In a zone previously heated to 400 to 470° C., InAs has precipitated in crystalline, predominantly monocrystalline, form.

Example 18

An alumina tube open at one end is provided at one end with 2 g. InSb and at the other end with 5 g. Sb in respective boats of alumina. The tube is placed into two furnaces located beside each other. The InSb is heated to 950° C., the Sb to 1000° C. Simultaneously, a current of argon is passed through the tube at the rate of 2 liters per hour. After 50 hours, the tube is cooled. InSb has precipitated, predominantly in form of monocrystals, in the zone previously at 320 to 450° C.

Example 19

Placed into an evacuated alumina ampule, near one end thereof, is an amount of 0.1 g. amorphous boron, and near the other end an amount of 1.2 g. as in respective boats of alumina. The ampule is heated in two furnaces located beside each other, so that the boron is kept at 1300° C. and the arsenic at 680° C. After 210 hours the ampule is cooled. In the intermediate zone, which was at 675 to 945° C., BAs has precipitated in crystalline, predominantly monocrystalline, form.

Example 20

Placed into an evacuated quartz ampule near one end thereof are 0.7 g. AlSb and near the other end 1.0 g. Sb in respective boats of aluminum oxide. The ampule is placed into two furnaces located beside each other. The AlSb is heated to 1050° C., and Sb to 620° C. After 48 hours the ampule is cooled. In the zone, previously at 650 to 800° C., AlSb has precipitated in crystalline form.

Example 21

Placed into an evacuated quartz ampule near one end thereof are 1 g. InSb and near the other end 1 g. Sb in respective boats of aluminum oxide. The ampule is heated in two furnaces in which the InSb is kept at 500° C. and the Sb at 620° C. respectively. After 106 hours the ampule is cooled. In the intermediate zone, previously at 388 to 400° C., InSb has precipitated in fine-crystalline form.

We claim:

1. The method of producing phosphides, arsenides and antimonides of boron, aluminum, gallium and indium of the type $A^{III}B^V$ in purified and crystalline constitution, which comprises passing a vapor current consisting of the $B^V$ element of said compound over a starting material selected from the group consisting of the $A^{III}B^V$ compound and the $A^{III}$ element thereof, in a high-temperature zone of a reaction system free of other reaction participants so that the $B^V$ element comes into contact with the starting material and enters into a physical-chemical reaction therewith, and then passing the vapors to a low-temperature zone and precipitating therein the compound in crystalline form, the temperature in the high-temperature zone being above the vaporization minimum of said starting material, and the minimum of temperature difference between said two zones being about 10 to 30° C.

2. The method of producing $A^{III}B^V$ compounds according to claim 1, wherein the minimum temperature in the high temperature zone for:

BP=530° C.   AlAs=400° C.
AlP=500° C.   GaAs=400° C.
GaP=400° C.   InAs=500° C.
InP=250° C.   AlSb=250° C.
BAs=450° C.   GaSb=200° C.
InSb=150° C.

3. The method of producing $A^{III}B^V$ compounds according to claim 1, wherein the temperature in the high-temperature zone for:

BP=1000–1600° C.   AlAs=900–1800° C.
AlP=900–1800° C.   GaAs=900–1600° C.
GaP=900–1600° C.   InAs=500–1000° C.
InP=500–1000° C.   AlSb=700–1700° C.
BAs=1000–1800° C.   GaSb=600–1600° C.
InSb=500–1600° C.

4. The method of producing $A^{III}B^V$ compounds according to claim 1, wherein the minimum temperature difference between said two zones for:

BP=30° C.   AlAs=20° C.
AlP=30° C.   GaSa=15° C.
GaP=15° C.   InAs=10° C.
InP=15° C.   AlSb=15° C.
BAs=30° C.   GaSb=10° C.
InSb=10° C.

5. The method of producing $A^{III}B^V$ compounds according to claim 1, wherein the temperature difference between said two zones for:

BP=100–600° C.   AlAs=150–800° C.
AlP=100–900° C.   GaSa=150–700° C.
GaP=100–900° C.   InAs=100–500° C.
InP=80–500° C.   AlSb=100–700° C.
BAs=200–850° C.   GaSb=50–500° C.
InSb=50–700° C.

6. The method of producing $A^{III}B^V$ compounds according to claim 5, wherein the temperature of the low-temperature zone is kept for:

BP=800–1500° C.   AlAs=350–1500° C.
AlP=500–1400° C.   GaAs=300–1200° C.
GaP=300–1000° C.   InAs=250–930° C.
InP=200–800° C.   AlAs=300–1050° C.
BAs=400–1600° C.   GaSb=250–690° C.
InSb=200–510° C.

7. The method of producing $A^{III}B^V$ compounds according to claim 1, which comprises driving said vapor of said $B^V$ element by means of a current of inert carrier gas over said starting material in an open reaction system.

8. The method of producing $A^{III}B^V$ compounds according to claim 7, wherein the speed of the gas current is 0.1 to 1000 m./hour.

9. The method of producing $A^{III}B^V$ compounds according to claim 7, wherein the reaction system is formed by an elongated vessel closed at only one end, and continuously withdrawing vapor of the $B^V$ element from the vessel through the open end.

10. The method of producing $A^{III}B^V$ compounds according to claim 1, which comprises using as reaction system an elongated vessel closed at both ends and vacuum-sealed during reaction.

11. The method of producing $A^{III}$-phosphides according to claim 1, which comprises maintaining the pressure of the phosphorous atmosphere in the reaction system at least at 0.01 atm.

12. The method of producing $A^{III}$-arsenides according to claim 1, which comprises maintaining the pressure of the arsenic atmosphere in the reaction system at least at 0.001 atm.

13. The method of producing $A^{III}$-antimonides according to claim 1, which comprises maintaining the pressure of the antimony atmosphere in the reaction system at least at $10^{-4}$ torr.

14. The method of producing phosphides and arsenides of the $A^{III}B^V$ type according to claim 1, which comprises maintaining the vapor pressure of the $B^V$ element in the reaction system between 0.5 and 10 atm.

15. The method of producing antimonides of aluminum, gallium and indium according to claim 1, which comprises maintaining the antimony vapor pressure in the reaction system for:

AlSb at $10^{-3}$ to 50 torr
GaSb at $10^{-3}$ to 10 torr
InSb at $10^{-3}$ to $10^{-2}$ torr 16. The method of producing $A^{III}B^V$ compounds according to claim 1, which comprises heating an elongated vessel forming the reaction system simultaneously in longitudinally spaced areas to three different temperatures respectively, producing at one temperature the vapor of the $B^V$ element, converting at another temperature the starting material to the gaseous phase, and precipitating at the third temperature the resulting $A^{III}B^V$ crystals.

17. The method of producing $A^{III}B^V$ compounds according to claim 1, which comprises placing into the low-temperature zone a substrate having a crystalline lattice compatible with that of the $A^{III}B^V$ crystals being formed, whereby a crystal $A^{III}B^V$ layer is epitaxially grown on the substrate.

18. The method of producing $A^{III}B^V$ compounds according to claim 1, which comprises repeating the method and using the crystalline product of the preceding performance as starting material in the repeated performance, thus increasing the total purifying effect.

19. The method of producing $A^{III}B^V$ compounds according to claim 1, which comprises admixing dopant substance to said vapor consisting of the $B^V$ element for producing $A^{III}B^V$ crystals of given conductance properties.

20. The method of producing $A^{III}B^V$ compounds according to claim 1, which comprises admixing dopant substance to said starting material for producing $A^{III}B^V$ crystals of given conductance properties.

21. The method of producing $A^{III}B^V$ compounds according to claim 1, which comprises adding dopant substance to at least one of the two reaction partners, and repeating the method with different dopant substance so as to produce $A^{III}B^V$ crystals with p-n junctions.

References Cited by the Examiner

UNITED STATES PATENTS

| | | | |
|---|---|---|---|
| 2,871,100 | 1/1959 | Guire et al. | 148—1.5 |
| 2,921,905 | 1/1960 | Chang | 252—62.3 |
| 2,937,075 | 5/1960 | Weiser | 23—204 |
| 3,019,092 | 1/1962 | Rosi et al. | 148—1.6 |
| 3,021,196 | 2/1962 | Merkel | 152—62.3 |
| 3,073,679 | 1/1963 | Stone | 23—204 |
| 3,094,388 | 6/1963 | Johnson et al. | 23—204 |

OTHER REFERENCES

Holonyak et al.: Article in the A.I.M.E. publication, Metallurgical Society Conferences, vol. 15, August 30–Sept. 1, 1961, pp. 40–59.

DAVID L. RECK, *Primary Examiner.*

NEIL F. MARKVA, *Assistant Examiner.*